United States Patent [19]

Vogt

[11] Patent Number: 5,718,452
[45] Date of Patent: Feb. 17, 1998

[54] SYSTEM FOR TRIPPING A RESTRAINT DEVICE IN A VEHICLE

[75] Inventor: Richard Vogt, Sinzing, Germany

[73] Assignee: Siemens Aktiengesellschaft, Munich, Germany

[21] Appl. No.: 681,818

[22] Filed: Jul. 29, 1996

[30] Foreign Application Priority Data

Jul. 28, 1995 [DE] Germany .......... 195 27 813.5

[51] Int. Cl.⁶ .................................................. B60R 21/08
[52] U.S. Cl. ............................................... 280/735
[58] Field of Search ................................... 280/735

[56] References Cited

U.S. PATENT DOCUMENTS

| | | | |
|---|---|---|---|
| 4,700,974 | 10/1987 | Andres et al. | 280/806 |
| 5,100,169 | 3/1992 | Goor et al. | 280/733 |
| 5,194,755 | 3/1993 | Rhee et al. | 307/101 |
| 5,201,542 | 4/1993 | Thuen et al. | 280/736 |
| 5,483,449 | 1/1996 | Caruso et al. | 280/735 |
| 5,502,301 | 3/1996 | Lord | 280/735 |
| 5,504,379 | 4/1996 | Mazur et al. | 280/735 |
| 5,522,617 | 6/1996 | Swart | 280/735 |
| 5,530,649 | 6/1996 | Fujishima | 280/735 |

FOREIGN PATENT DOCUMENTS

| | | |
|---|---|---|
| 0 471 871 A1 | 2/1992 | European Pat. Off. |
| 9001803 U | 6/1990 | Germany. |
| 39 19 376 A1 | 12/1990 | Germany. |
| 40 16 047 A1 | 11/1991 | Germany. |

*Primary Examiner*—Kenneth R. Rice
*Attorney, Agent, or Firm*—Herbert L. Lerner; Laurence A. Greenberg

[57] ABSTRACT

A system for tripping a restraint device includes a trip circuit disposed centrally in a vehicle and an ignition device disposed noncentrally. The ignition device communicates with the trip circuit over a data line. A protection device is disposed in the ignition device. The protection device is preferably constructed as a mechanical switch which is dependent on acceleration. The likelihood that interference variables will simultaneously affect both the trip circuit and the protection device is reduced because of the spatial separation of the protection device and the trip circuit.

12 Claims, 1 Drawing Sheet

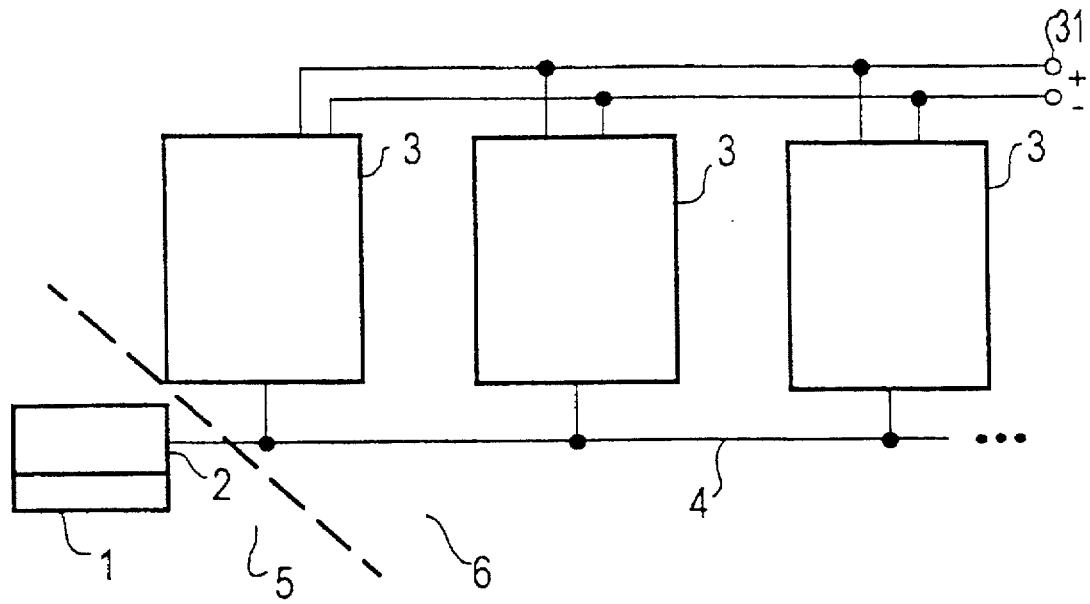
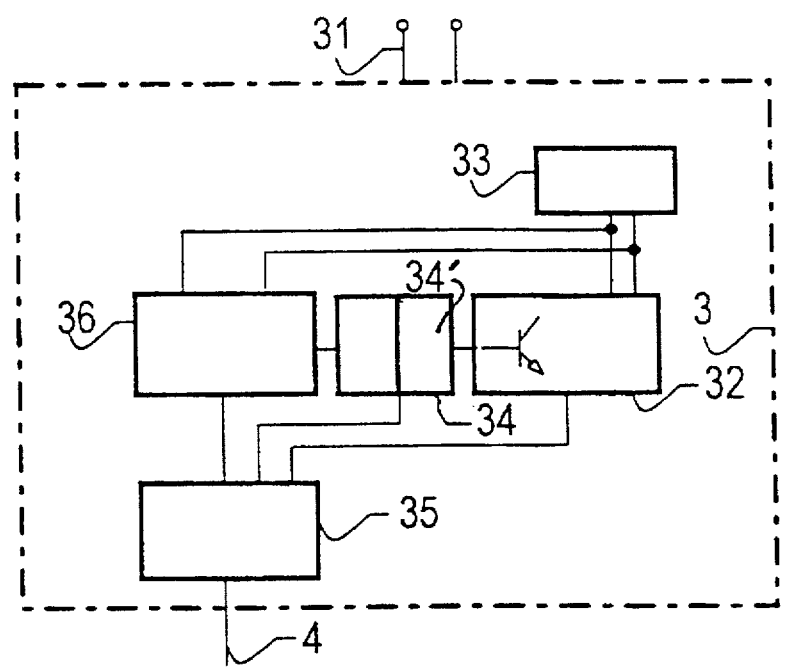

SYSTEM FOR TRIPPING A RESTRAINT DEVICE IN A VEHICLE

BACKGROUND OF THE INVENTION

Field of the Invention

The present invention relates to a system for tripping a restraint device in a vehicle, including a trip circuit which evaluates signals furnished by a sensor device, and an ignition device which is located spatially separately from the trip circuit in the vehicle, which communicates with the trip circuit through a data line and which has an energy supply and a controllable ignition stage.

One such system, which is known from German Published, Non-Prosecuted Patent Application DE 39 19 376 A1, has a trip circuit that communicates with an ignition device over a line. The ignition device includes an energy supply and a controllable ignition stage and is connected through the controllable ignition stage to an ignition element of the restraint device. If an unlocking signal is transmitted from the trip circuit to the ignition device and is recognized as such by the ignition device, then the ignition stage is made conducting, so that the ignition element is ignited by an ignition signal that follows the unlocking signal.

In another system for tripping restraint devices in a vehicle, which is known from Published European Patent Application 0 471 871 A1, signals furnished by a sensor device for collision detection are evaluated in a trip circuit disposed centrally in the vehicle. The trip circuit triggers a plurality of ignition devices, which are located near the restraint devices, as needed through a data line. Each ignition device transmits the ignition energy, which is furnished by an energy supply such as an ignition capacitor of the ignition device, to an ignition element of the associated restraint device.

However, such systems can also trip their restraint devices if the trip circuit is defective, for instance, or if the sensor device furnishes defective signals.

A system which is known from German Utility Model DE 90 01 803 U1 has an ignition element that is tripped only whenever two mechanical acceleration sensors and an electronic trip circuit that evaluates a signal of an acceleration sensor simultaneously furnish an enable signal for the tripping.

U.S. Pat. No. 5,201,542 discloses a gas generator housing in which an acceleration sensor is disposed. If adequate acceleration is detected by the sensor, an ignition element that is also located in the gas generator housing is ignited.

SUMMARY OF THE INVENTION

It is accordingly an object of the invention to provide a system for tripping a restraint device in a vehicle, which overcomes the hereinafore-mentioned disadvantages of the heretofore-known devices of this general type, which has an ignition device that is spatially separated from a trip circuit and which reliably trips the restraint device as needed and simultaneously prevents it from being tripped by mistake.

With the foregoing and other objects in view there is provided, in accordance with the invention, a system for tripping a restraint device in a vehicle, comprising a sensor device supplying signals; a trip circuit for receiving and evaluating the signals supplied by the sensor device; a data line connected to the trip circuit; and an ignition device being spatially separated from the trip circuit in a vehicle, the ignition device being connected to the data line for communicating with the trip circuit through the data line, and the ignition device having an energy supply, a controllable ignition stage and a protection device acting as a function of acceleration for blocking or enabling the ignition stage.

In accordance with another feature of the invention, the protection device has an acceleration sensor that prevents faulty tripping and that in particular is located spatially separately from the trip circuit in the ignition device, and blocks or enables the ignition stage as a function of the acceleration ascertained by this sensor.

The advantage of the placement of the protection device in the ignition device in this special way, over a disposition of the protection device in the trip circuit, is that interference variables, such as an electromagnetic field, a thermal variable or a mechanical variable, that do not extend over the entire vehicle, can be detected by a central control unit with the trip circuit, but not by the ignition device having the protection function that is spatially separated by the control unit, and vice versa. Interference variables of limited extent thus do not cover all of the system components that are relevant to the decision to trip.

The noncentrally located protection device also prevents faulty tripping caused by interference in the form of induced tripping data patterns in the region of the data line or in the serial interfaces of the "trip circuit" and "ignition device" communication partners.

Accordingly, the restraint device is tripped only whenever the controllable ignition stage of the ignition device is made conducting by the trip circuit and when simultaneously the protection device has a state that enables the ignition of the ignition element. The trip circuit and the protection device are spatially separated from one another and therefore local interference variables continue to have no effect on the reliability of the system.

In accordance with a further feature of the invention, the protection device is preferably constructed as a mechanical switch acting as a function of acceleration, which is also known as a safing sensor, and thus is highly reliable because of its independence of any supply voltage.

In accordance with an added feature of the invention, the protection device is a micromechanical switch acting as a function of acceleration.

In accordance with an additional feature of the invention, the protection device has an analog sensor acting as a function of acceleration, and the protection device has an evaluation circuit.

In accordance with yet another feature of the invention, the protection device has an analog micromechanical sensor acting as a function of acceleration, and the protection device has an evaluation circuit.

In accordance with yet a further feature of the invention, there is provided an integrated circuit including the ignition device and the protection device.

In accordance with yet an added feature of the invention, the ignition device includes a diagnostic device.

In accordance with yet an additional feature of the invention, there is provided an ignition element of a restraint device, the ignition device being disposed near the ignition element.

In accordance with again another feature of the invention, there is provided an ignition primer plug of a restraint device, the ignition device being disposed in the ignition primer plug.

In accordance with a concomitant feature of the invention, there is provided an ignition primer housing of a restraint device, the ignition device being disposed in the ignition primer housing.

Other features which are considered as characteristic for the invention are set forth in the appended claims.

Although the invention is illustrated and described herein as embodied in a system for tripping a restraint device in a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a system for tripping restraint devices having noncentrally located ignition devices; and FIG. 2 is a block circuit diagram of a noncentrally located ignition device with a protection device.

DESCRIPTION OF THE PREFERRED EMBODIMENTS

Referring now in detail to the figures of the drawings, in which identical elements have the same reference numerals throughout, and first, particularly, to FIG. 1 thereof, there is seen a system for tripping restraint devices in a vehicle with dispersed ignition devices 3, which communicate over a data line 4 with a trip circuit 2 located in a central control unit 5. The ignition devices 3 are supplied by an energy supply 31. The ignition devices 3 are located spatially separately from the trip circuit 2 and a sensor device 1, and are usually near whichever restraint device 6 or its ignition element is tripped by the respective ignition device 3.

The sensor device 1 may be located centrally in the trip circuit 2 or may be dispersed within the vehicle. The trip circuit 2 is preferably constructed as a microprocessor and processes analog or quasi-analog signals of the sensor device 1 in accordance with selected algorithms. If the vehicle has a plurality of restraint devices, then the restraint devices to be tripped are selected as a function of the severity and direction of a detected collision and are optionally triggered in a chronologically staggered manner.

Such a system with dispersed ignition devices is known to have improved security against interference, especially a mistaken imposition of a voltage, such as the battery voltage, on the data line, which no longer leads to faulty tripping of restraint devices. This is because the tripping signal is transmitted as an encoded data word rather than as a high, energy-bearing ignition pulse as in systems with centrally located ignition devices. Due to the short line path between the energy supply and the ignition element in noncentralized ignition devices, the ignition elements are ignited with little loss and virtually no delay. The ignition elements are constructed as low-energy ignition primers or detonating compositions. Ignition capacitors, which are used as sources of reserve energy, can be small in capacity, since line transmission losses no longer need to be taken into account in calculating the tripping energy of the ignition elements. Moreover, such a system can be easily expanded by adding more restraint devices.

FIG. 2 shows a dispersed ignition device 3 according to the invention. The ignition device 3 is connected to the vehicle battery as an energy supply 31. An ignition capacitor, which is not shown in FIG. 2, serves as an energy reserve and if there is a loss of battery voltage during an accident it furnishes the necessary energy to ignite an ignition element 33. The ignition element 33, which fires or ignites an air bag for the driver, the front-seat passenger, the side of the vehicle, or the rear seat or other location, or a belt tightener, or some other restraint device to protect vehicle passengers as needed, is also connected to a controllable ignition stage 32. A serial interface 35 receives and evaluates data from the data line 4, and if a tripping data pattern is detected, it switches the controllable ignition stage 32, which is preferably constructed as a controllable power transistor, to make it conducting.

However, if a protection device 34 itself detects a state of the vehicle that does not justify tripping of the restraint device, the protection device 34 may prevent firing of the ignition element 33 because of the conducting state of the controllable ignition stage 32. The protection device may be constructed as a mechanical or micromechanical switch acting as a function of acceleration. Such a switch may be disposed directly in the ignition circuit between the energy supply 31, the controllable ignition stage 32, and the ignition element 33, so that an ignition current from the energy supply 31 can only flow through the controllable ignition stage 32 to the ignition element 33 when the switch is closed. If the switch is not constructed for conducting high currents, then it triggers a power switch disposed in the ignition circuit.

The response threshold of such a switch is set in such a way that the switch closes when an acceleration acting upon it is less than an acceleration at which the system is meant to trip the restraint devices. A time slot for the tripping of the restraint device by the trip circuit is defined through the use of the switch.

However, the protection device 34 may also have an analog or micromechanical sensor 34' acting as a function of acceleration with an associated trip circuit. The trip circuit evaluates the sensor signal in accordance with an algorithm and compares it with a limit value. If the limit value is exceeded, the protection device outputs an enable signal.

If the protection device is testable, then it is tested by the trip circuit 2 at regular intervals, including during on-line operation of the system. An intelligent interface of the ignition device 3 can also optionally itself take on the task of testing the protection device 34.

A diagnostic device 36 checks the functions and parameters of the ignition device. For instance, the ignition element resistance, the circuit of the ignition device 3 with its elements, and the data line 4 may be checked for functional status. The exchange of data between the diagnostic device 36 and the trip circuit 2 takes place over the data line 4.

The data line 4 may be constructed as a single-wire line, a two-wire line, an optoelectronic line, a data bus, or another medium that is suitable for data transmission (for instance including wireless data transmission).

The invention does not pertain merely to a system for tripping one restraint device. More than one restraint device can be readily triggered by the system as well. Each restraint device is then assigned an ignition device 3, or a plurality of preferably adjacent restraint devices (including a plurality of individually inflatable chambers of one restraint device) can be assigned one common ignition device 3, which triggers a plurality of ignition elements 33. The individual ignition devices 3 can be selected and triggered in chronologically staggered fashion. Each ignition device 3 then has its own protection device 34.

The ignition device 3 is preferably disposed as close as possible to the ignition element 33 of the restraint device. The ignition device 3 is then disposed in an ignition primer or detonating composition plug or an ignition primer housing of the restraint device.

If the protection device 34 is an integratable sensor or an integratable switch, then aside from the ignition element 34 it is advantageous to place the ignition device 3 together with the protection device 34 in an integrated circuit.

I claim:

1. A system for tripping a restraint device in a vehicle, comprising:

a sensor device supplying signals;

a trip circuit for receiving and evaluating the signals supplied by said sensor device;

a data line connected to said trip circuit; and an ignition device being spatially separated from said trip circuit in a vehicle, said ignition device being connected to said data line for communicating with said trip circuit through said data line, and said ignition device having an energy supply, a controllable ignition stage and a protection device acting as a function of acceleration for blocking or enabling said ignition stage.

2. The system according to claim 1, wherein said protection device has an acceleration sensor for blocking or enabling said ignition stage as a function of an acceleration ascertained by said acceleration sensor.

3. The system according to claim 1, wherein said protection device is a mechanical switch acting as a function of acceleration.

4. The system according to claim 1, wherein said protection device is a micromechanical switch acting as a function of acceleration.

5. The system according to claim 1, wherein said protection device has an analog sensor acting as a function of acceleration, and said protection device has an evaluation circuit.

6. The system according to claim 1, wherein said protection device has an analog micromechanical sensor acting as a function of acceleration, and said protection device has an evaluation circuit.

7. The system according to claim 4, including an integrated circuit including said ignition device and said protection device.

8. The system according to claim 6, including an integrated circuit including said ignition device and said protection device.

9. The system according to claim 1, wherein said ignition device includes a diagnostic device.

10. The system according to claim 1, including an ignition element of a restraint device, said ignition device being disposed near said ignition element.

11. The system according to claim 1, including an ignition primer plug of a restraint device, said ignition device being disposed in said ignition primer plug.

12. The system according to claim 1, including an ignition primer housing of a restraint device, said ignition device being disposed in said ignition primer housing.

* * * * *